May 12, 1936.  G. E. NERNEY  2,040,527
EYEGLASS CONSTRUCTION
Filed March 20, 1933
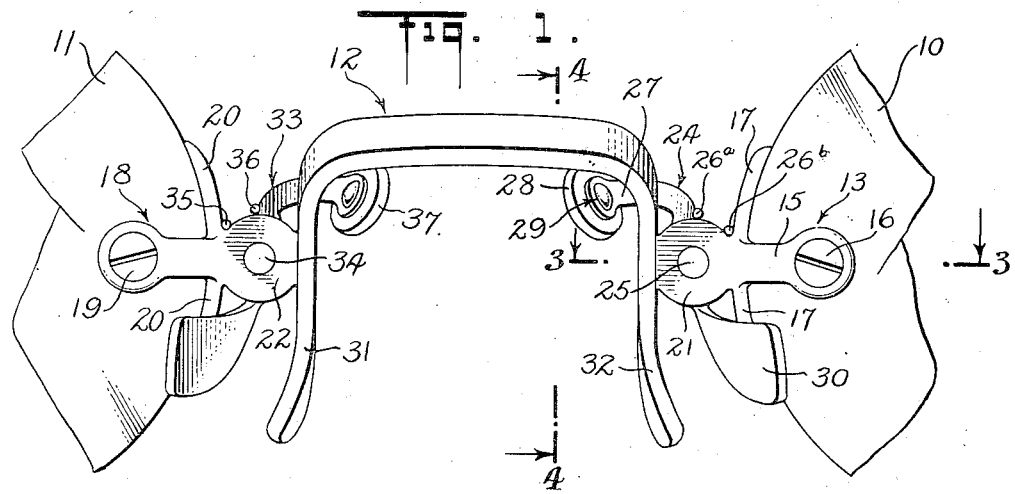
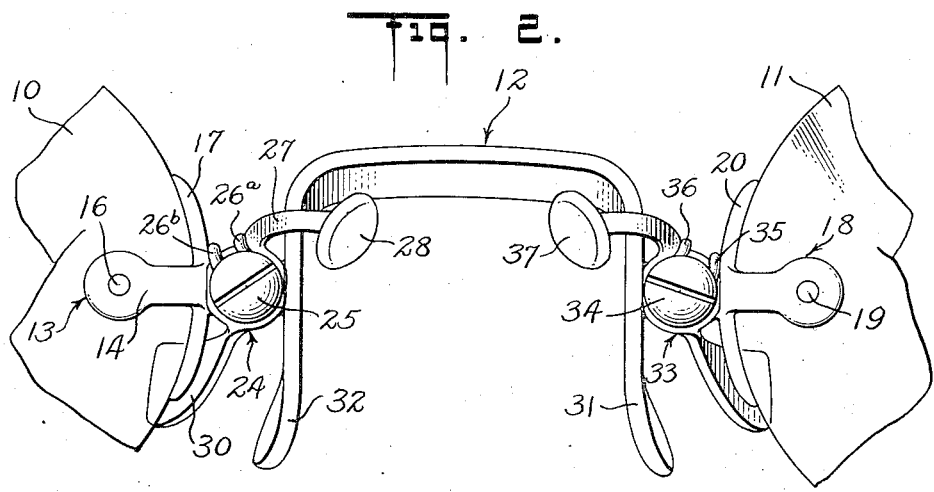
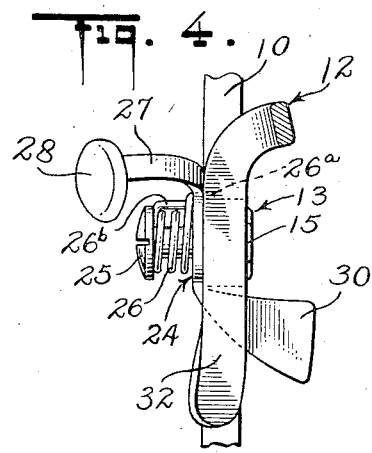
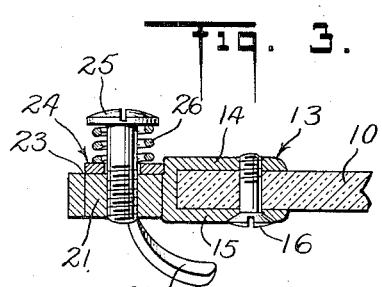
INVENTOR
George E. Nerney
BY
ATTORNEYS Patented May 12, 1936

2,040,527

UNITED STATES PATENT OFFICE 2,040,527

EYEGLASS CONSTRUCTION

George E. Nerney, Attleboro, Mass., assignor to Bay State Optical Company, Attleboro, Mass., a corporation of Maine Application March 20, 1933, Serial No. 661,718

11 Claims. (Cl. 88—50)

This invention relates to an eyeglass construction and more particularly to a construction wherein an eyeglass frame is held in position by swinging levers or the like.

One of the objects of this invention is to provide an eyeglass construction which will be simple, practical and thoroughly durable. Another object is to provide a construction of the above character which will be attractive in appearance and effective in operation. Another object is to provide a construction of the above character which may be manufactured economically with a minimum amount of labor. Another object is to provide a construction of the above character wherein the individual parts as well as their particular construction are so designed as to reduce expenditure for materials or the like. Another object is to provide a construction of the above character which may be easily assembled and adjusted to suit the particular needs of the wearer. Another object is to provide a construction of the above character which will not irritate the nose of the wearer and whose adjustment will remain fixed over a period of time. Another object is to provide a construction of the above character which will maintain its allotted position on the nose of the wearer without tilting or slipping. Other objects will be in part obvious and in part pointed out hereinafter.

The invention accordingly consists in the features of construction, combinations of elements, and arrangements of parts as will be exemplified in the structure to be hereinafter described, and the scope of the application of which will be indicated in the following claims.

In the accompanying drawing, in which is shown one of the various possible embodiments of my invention, Figure 1 is a fragmentary front elevation of an eyeglass frame;

Figure 2 is a fragmentary rear elevation of the frame shown in Figure 1;

Figure 3 is a horizontal sectional view taken along the line 3—3 of Figure 1, and Figure 4 is a vertical sectional view taken along the line 4—4 of Figure 1.

Similar reference characters refer to similar parts throughout the several views of the drawing.

In order to set forth a more comprehensive understanding of certain features of this invention, it might here be pointed out that eyeglass frames of the "pinch nose" variety have presented many difficulties in construction, operation and use. For example, these frames are usually characterized by a pair of swinging nose engaging members which engage substantial portions of the opposite sides of the nose. These members must be adjusted in order to fit the particular irregularities existing in each individual nose and such adjustments must be fine to approximate a thorough connection between the nose and the frame. One section of these nose engaging members is apt to press against the side of the nose with greater force than another section and this unevenness of pressure application may cause the frame to tilt forward. The fact that a number of these frames have nose engaging members which only contact the nose at points adjacent the eyes is also undesirable, for this portion of the nose is characterized by its softness and pliability, thus affording a poor foundation for the frame. The difficulties experienced in adjusting the nose engaging parts of this type of frame are increased due to the fact that such parts are often characterized by extreme delicacy of construction. One of the objects of this invention is to provide a construction in which the many difficulties hereinabove described will be successfully overcome.

Referring now to the drawing in detail, there is shown in Figure 1 a pair of lenses 10 and 11 connected by way of a bridge generally indicated at 12. Connected to lens 10 is a lens retaining part generally indicated at 13 and including a pair of ears 14 and 15 (Figure 3) embracing the opposite surfaces of the lens; a screw 16 extends through ear 15 and lens 10 and is threaded into ear 14 to hold the lens retaining part in position. Joining the ends of ears 14 and 15 and substantially following the periphery of lens 10 is a strap 17 which coacts with screw 16 to hold the lens retaining part 13 in proper position.

Also, a lens retaining part generally indicated at 18 is connected to lens 11, this part being substantially similar in construction and position to retaining part 13. Accordingly, a screw 19 extends through both ears of part 18 and through the lens to secure the ears of the part in proper position and a strap 20 is connected to the ears and follows the periphery of lens 11.

A pair of bearing parts 21 and 22 are connected to straps 17 and 20 preferably in alinement with the ear portions of these straps. As the construction of both parts 21 and 22 as well as the parts associated therewith is substantially identical, that upon one side only will be described in detail.

Part 21 has a rear surface 23 whose plane is substantially parallel to the plane of lens 10 and preferably inset from the outer surface of ear 14, as best shown in Figure 3. A swinging lever generally indicated at 24 is mounted upon surface 23 and extending therethrough and threaded into part 21 is a screw 25. Disposed between the head of screw 25 and lever 24 is a spiral spring 26, the construction of which will be more fully described hereinafter. Thus, screw 25 pivotally connects lever 24 to bearing part 21 and preferably the axis of this screw is substantially at right angles to the plane of lens 10. As more clearly shown in Figure 4, lever 24 has a portion 27 which extends rearwardly in a direction substantially toward the center of bridge 12 as viewed in Figure 1. Secured to the end of portion 27 is a nose pad 28 of any suitable construction preferably by way of a ball and socket joint generally indicated at 29 (Figure 1). The opposite end portion 30 of lever 24 extends outwardly, as viewed in Figure 1, between lens 10 and bridge 12. Thus, as more fully shown in Figure 1, lever 24 may be moved about its axis in directions toward or away from the nose of the wearer distances corresponding to the movement of portion 30 with the fingers. One end 26a of spring 26 (Figure 1) preferably rests against portion 27 of lever 24, while the other end 26b thereof preferably rests against strap 17 so that the spring urges lever 24 in a counter-clockwise direction or toward the nose of the wearer.

Bridge 12 is secured at its opposite sides to bearing parts 21 and 22 and preferably has depending ends 31 and 32 extending downwardly from parts 21 and 22 to engage the nose at points spaced therebelow. Ends 31 and 32 preferably diverge in order to follow the contour of the nose of the wearer and are of sufficient length so that they may be easily adjusted. As better shown in Figure 4, end 32 is in substantial alinement with lens 10 and this is also true of end 31.

A lever generally indicated at 33, substantially similar in construction to lever 24, is pivotally connected to bearing part 22 by way of a screw 34 and disposed therebetween is a spring having an end 35 engaging strap 20 and an end 36 engaging the upper portion of the lever. Also, lever 33 carries a nose pad 37 substantially similar in construction and position to nose pad 28. Accordingly, levers 33 and 24 are both forced inwardly about their pivotal points so as to force the nose pads 28 and 37 against the opposite sides of the nose. Furthermore, levers 33 and 24 are so shaped that nose pads 28 and 37 engage the soft portions of the nose adjacent the eyes.

The depending ends 31 and 32 of bridge 12 extend downwardly to engage those sections of the nose which are more firm due to bone structure. Accordingly, the depending ends 31 and 32 may be permanently adjusted to fit snugly against the firm portions of the nose and act in a supporting capacity for the entire frame. Levers 24 and 33 exert a sidewise pressure against the narrow part of the nose and this sidewise pressure is emphasized because of the axes of these levers which have been described above as substantially perpendicular to the plane of the lenses. Also, as pointed out above, nose pads 28 and 37 are spaced to the rear of depending portions 31 and 32 which are in substantially the same plane as lenses 10 and 11. I have discovered that by this construction the depending ends 31 and 32 as well as the entire bridge 12 serve to support a substantial portion of the weight of the frame, and levers 24 and 33 act as stabilizers to offset any tendency of the frame to tilt in a forward direction as viewed in Figure 1. Furthermore, I have found that usually better results are obtained by having the depending ends 31 and 32 in substantial alinement with lenses 10 and 11.

Accordingly I have provided an eyeglass frame the weight of which is supported by stationary parts (bridge 12 and depending ends 31 and 32) in engagement with the firmer portions of the nose and susceptible of a permanent and lasting adjustment. The swinging levers 24 and 33 stabilize and secure the frame in position and this is largely due to the fact that they do not support most of the weight of the frame, consequently they may be made smaller and the pressure which they exert against the nose, i. e. the tension of the actuating springs, may be reduced without sacrificing stability. Not only is this construction practical and simple to manufacture, but it is comfortable and reliable in use.

It will thus be seen that I have provided a thoroughly durable and efficient construction in which the several objects hereinabove referred to are successfully accomplished.

As many possible embodiments may be made of the above invention and as many changes might be made in the embodiment above set forth, it is to be understood that all matter hereinbefore set forth or shown in the accompanying drawing is to be interpreted as illustrative and not in a limiting sense.

I claim:

1. In eyeglass construction, in combination, a bridge having a pair of depending end portions extending downwardly to engage the nose of the wearer, a pair of lens-securing parts connected to said bridge, said depending portions being substantially in the plane of the lenses held in said securing parts, a pair of lever elements pivotally connected to said parts and having one end extending forwardly from the plane of said lenses and the other end extending upwardly, inwardly, and rearwardly to a point spaced above the ends of said depending portions, the pivotal axes of said elements being substantially at right angles to the plane of said lenses, and a pair of nose engaging members connected to said last-mentioned ends of said elements.

2. In eyeglass construction, in combination, a bridge having a pair of depending end portions extending downwardly to engage the nose of the wearer, a pair of lens-securing parts connected to said bridge, said depending portions being substantially in the plane of the lenses held in said securing parts, a pair of lever elements pivotally connected to said parts and having one end extending forwardly from the plane of said lenses and the other end extending upwardly, inwardly, and rearwardly to a point spaced above the ends of said depending portions, the pivotal axes of said elements being substantially at right angles to the plane of said lenses, a pair of nose engaging members connected to said last-mentioned ends of said elements, and resilient means for forcing said elements about their pivotal axes toward the nose of the wearer.

3. In eyeglass construction, in combination, a pair of lens securing parts, portions of said parts extending from the periphery of the lenses and having sides substantially parallel to the plane of said lenses, a bridge secured to said portions, a pair of swinging nose engaging members having a flattened portion in engagement with said sides of said first-mentioned portions, one end of said nose engaging members extending outwardly and the other end portion of said nose engaging members extending upwardly, inwardly and rearwardly to engage the nose of the wearer at points substantially adjacent the corners of the wearer's eyes, means pivotally connecting said nose engaging members in said position on said first-mentioned portions, and springs associated with said nose engaging members and adapted to force said last-mentioned portions toward each other.

4. In eyeglass construction, in combination, a bridge, means securing the lenses of a mounting to said bridge including a pair of parts disposed between said bridge and the periphery of said lenses, portions of said bridge depending downwardly from said parts to engage the nose at points substantially in the same plane as said lenses, a pair of nose engaging members pivotally secured to said parts and adapted to swing toward and away from said nose, one end of each of said nose engaging members extending upwardly, inwardly, and rearwardly to engage the nose at points spaced above and to the rear of the points of engagement of said depending portions, and the pivotal axes of said nose engaging members being substantially at right angles to the plane of said lenses, and means adapted to urge said nose engaging members toward the nose of the wearer.

5. In eyeglass construction, in combination, a bridge, means securing the lenses of a mounting to said bridge including a pair of parts disposed between said bridge and the periphery of said lenses, portions of said bridge depending downwardly from said parts to engage the nose at points substantially in the same plane as said lenses, a pair of nose engaging members each having portions in engagement with said parts and having portions extending upwardly, inwardly, and rearwardly, screws extending through said portions of said nose engaging members and into said parts to form a pivotal connection therebetween, the axes of said screws being substantially at right angles to the plane of said lenses, and resilient means associated with said screws and adapted to force said members toward the portions of the nose of the wearer adjacent the corners of the wearer's eyes.

6. In eyeglass construction, in combination, means forming a bridge, a pair of lenses secured to said means, said means including portions extending from said bridge to said lenses, a pair of swinging nose engaging members pivotally connected to said portions along axes perpendicular to the plane of said lenses, said nose engaging members including portions extending upwardly, inwardly, and rearwardly from their pivotal points to engage the nose of the wearer at points substantially adjacent the corners of the wearer's eyes, means for pivoting said nose engaging members, and spring means adapted to swing said members toward the nose of the wearer.

7. In eyeglass construction, in combination, a bridge, means securing the lenses of a mounting to said bridge including a pair of parts disposed between said bridge and the periphery of said lenses, portions of said bridge depending downwardly from said parts to engage the nose at points substantially in the same plane as said lenses, said parts presenting surfaces substantially parallel to the plane of said lenses, a pair of nose engaging members central portions of which are in contact with said surfaces of said parts, one end of said nose engaging members extending outwardly between said lenses and the depending portions of said bridge to points spaced in front of the plane of said lenses and the other end of said nose engaging members extending upwardly, inwardly and rearwardly to engage the nose of the wearer, screws extending through said central portions of said nose engaging members and threaded into said parts, the axes of said screws being substantially at right angles to the plane of said lenses, and springs disposed between said screws and said central portions and adapted to force said nose engaging members toward the base of the nose of the wearer.

8. In eyeglass construction, in combination, a bridge, lens connecting parts secured to the opposite sides of said bridge, a pair of arms extending downwardly from said parts to engage the nose, a pair of lever elements pivotally connected to said parts to pivot about axes substantially perpendicular to the plane of said arms, one end of said elements extending upwardly, inwardly, and to the rear of said plane, nose pads connected to said last-mentioned ends of said elements, and means for forcing said elements to pivot about their axes in directions toward the nose of the wearer, said nose pads being spaced above the ends of said arms and above the pivotal axes of said lever elements to engage the wearer's nose at upper and inner portions thereof.

9. In eyeglass construction, in combination, a bridge having a pair of depending end portions extending downwardly to engage the nose of the wearer, a pair of lens securing parts connected to said bridge, said depending portions being substantially in the plane of the lenses held in said securing parts, a pair of lever elements pivotally connected to said parts and having one end extending forwardly from the plane of said lenses and the other end extending upwardly, inwardly, and rearwardly to a point spaced above the ends of said depending portions, the pivotal axes of said elements being substantially at right angles to the plane of said lenses, and a pair of nose engaging members connected to said last-mentioned ends of said elements.

10. In eyeglass construction, in combination, a bridge having a pair of depending end portions extending downwardly to engage the nose of the wearer, a pair of lens securing parts connected to said bridge, said depending portions being substantially in the plane of the lenses held in said securing parts, a pair of lever elements pivotally connected to said parts and having one end extending forwardly from the plane of said lenses and the other end extending upwardly, inwardly and rearwardly to a point spaced above the ends of said depending portions, the pivotal axes of said elements being substantially at right angles to the plane of said lenses, a pair of nose engaging members connected to said last-mentioned ends of said elements, and resilient means for forcing said elements about their pivotal axes toward the nose of the wearer.

11. In eyeglass construction, in combination, a pair of lenses, means including a bridge member secured to said lenses, said means also including portions respectively adjacent the edges of said lenses, a pair of swinging nose engaging members including portions extending upwardly, inwardly and rearwardly to engage the nose of the wearer at points substantially adjacent the corners of the wearer's eyes, said members also including finger-operable portions extending frontwardly, elements pivotally securing said members to said first-mentioned portions in axes substantially perpendicular to the plane of said lenses, and spring means adapted to swing said members toward the nose of the wearer.

GEORGE E. NERNEY.